C. F. SHERMAN.
CHUCK.
APPLICATION FILED OCT. 18, 1919.
1,410,612.
Patented Mar. 28, 1922.
2 SHEETS—SHEET 2.
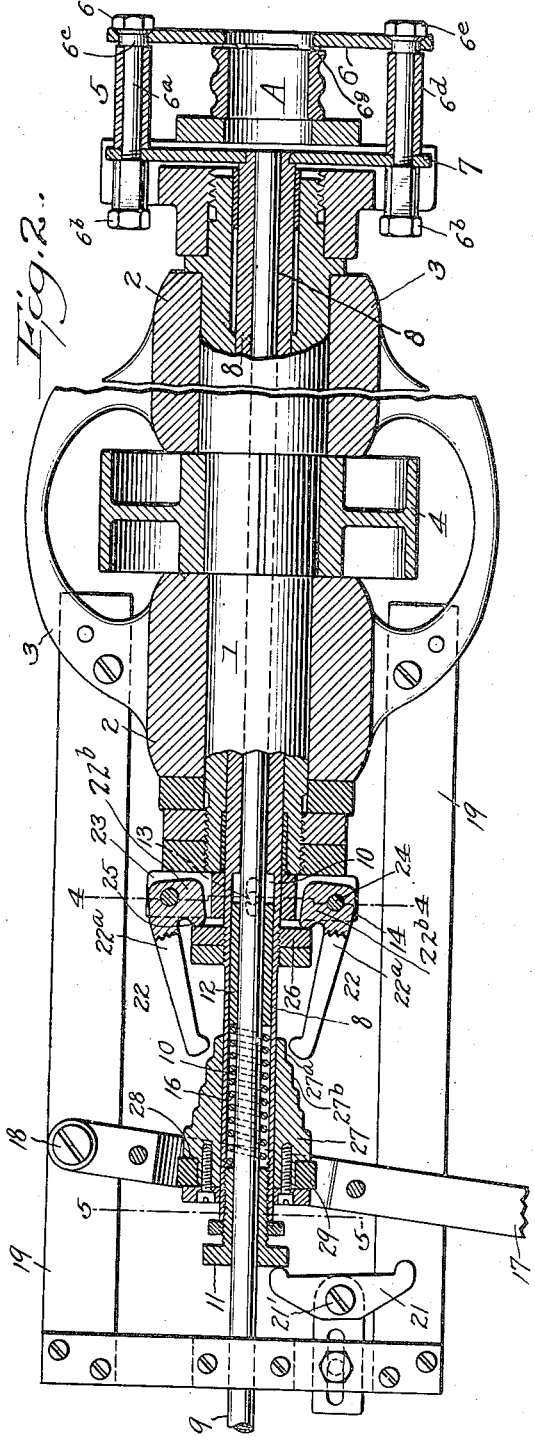
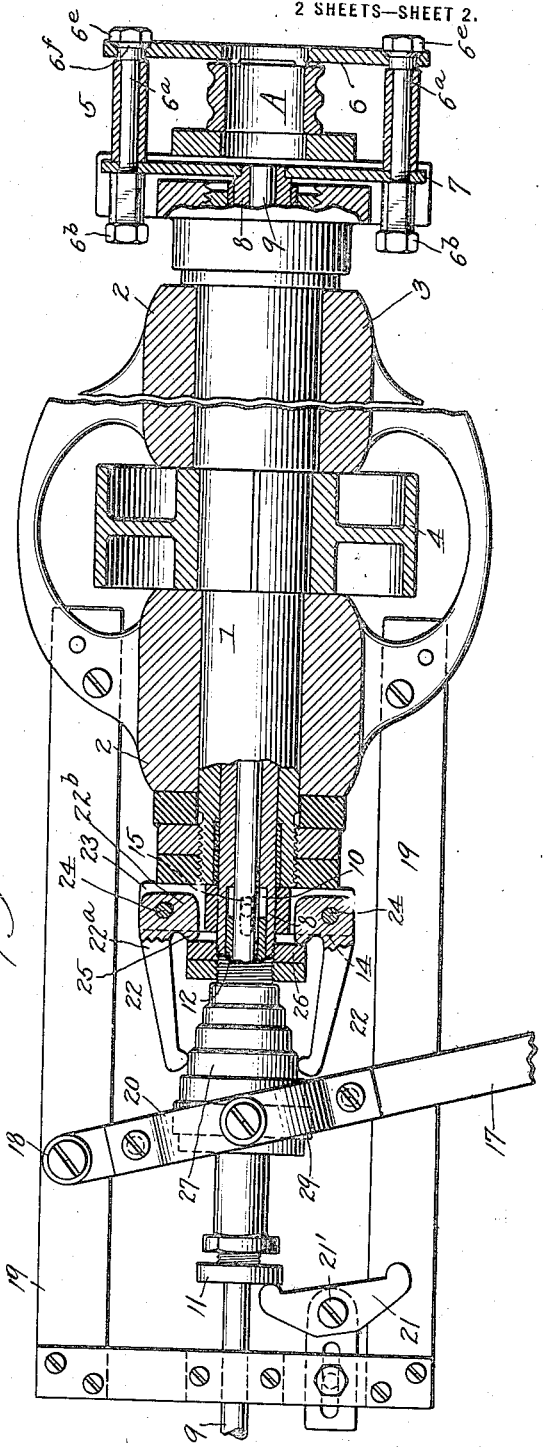
INVENTOR.
C. F. Sherman
BY
Rogers, Kennedy Campbell
ATTORNEY.S

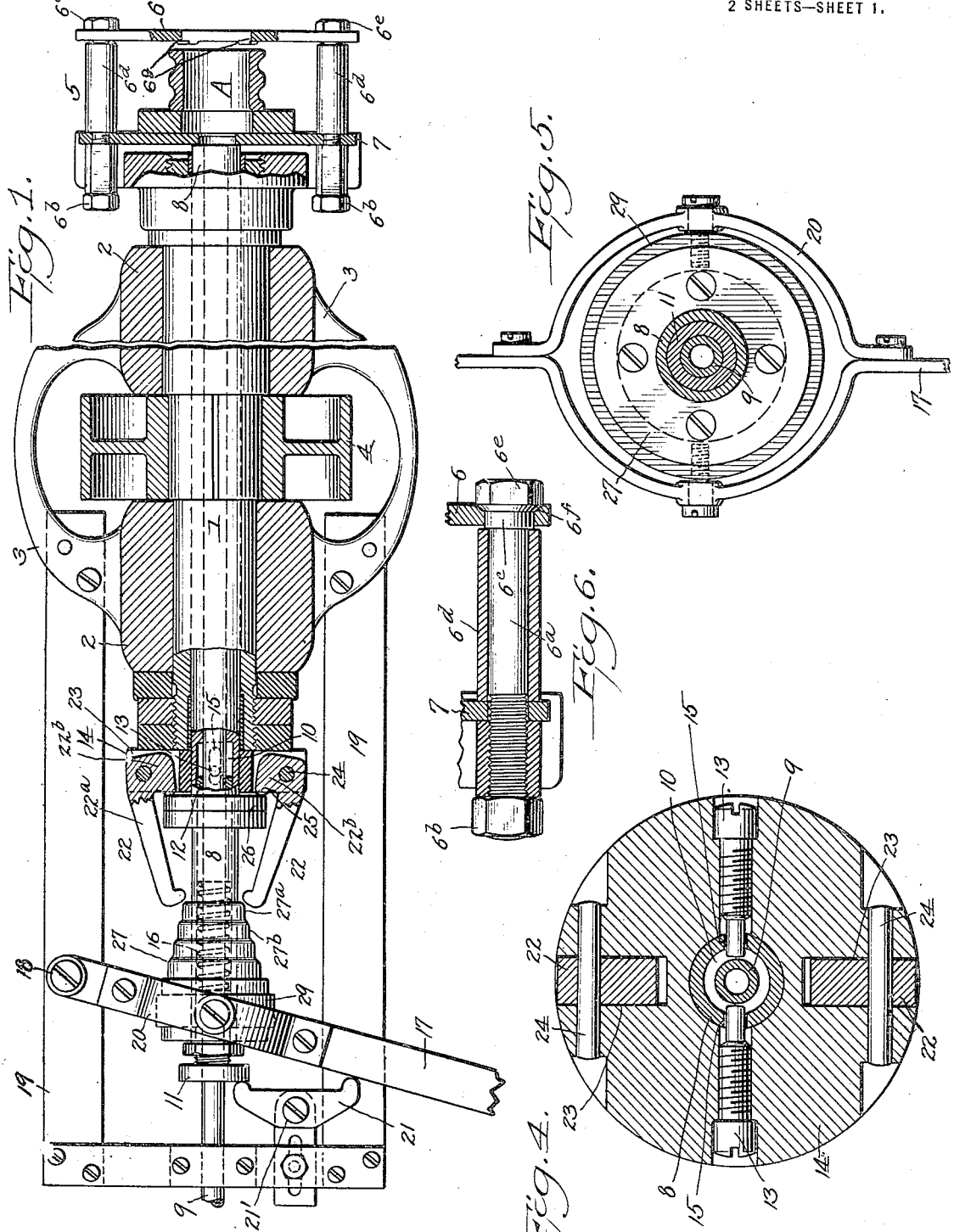

UNITED STATES PATENT OFFICE.

CORTIS F. SHERMAN, OF HARTFORD, CONNECTICUT, ASSIGNOR TO THE HESS-BRIGHT MANUFACTURING COMPANY, A CORPORATION OF DELAWARE.

CHUCK.

1,410,612.  Specification of Letters Patent.  Patented Mar. 28, 1922.

Application filed October 18, 1919. Serial No. 331,614.

*To all whom it may concern:*

Be it known that I, CORTIS F. SHERMAN, a citizen of the United States, residing at Hartford, in the county of Hartford and State of Connecticut, have invented certain new and useful Improvements in Chucks, of which the following is a specification, reference being had therein to the accompanying drawing.

This invention relates to work holding chucks designed more particularly for holding annular or ring-like work pieces, such for instance as the casing rings of anti-friction bearings. In handling work of this kind where the grinding or cutting or other operation is performed for instance on the bore of the ring, the latter is held in the chuck and rotated about its longitudinal axis, and an operating tool usually in the form of a wheel, is rotated about an axis parallel with the axis of the ring and is entered in the bore of the ring. In such operation it is sometimes the practice to center the work by bringing the operating wheel into contact with the work, the latter being first clamped on the chuck under a comparatively light pressure to permit it to be shifted laterally by the operating wheel until properly centered, and then clamped firmly and finally, to permit the wheel to operate thereon.

The present invention is designed to enable the work to be thus manipulated, and it consists of improved features of construction and arrangement of the parts on the chuck operating mechanism, by the operation of which the work is first held on the chuck with a comparatively light yielding pressure to permit the centering operation to be performed, and is then positively and firmly held to permit the grinding or other operations to be performed.

In the accompanying drawings:

Fig. 1 is a longitudinal sectional plan view of a chuck embodying my invention, with the operative parts in the position they occupy when the work piece is released;

Fig. 2 is a similar view with the parts in position they occupy when the work is clamped with spring pressure to permit it to be centered;

Fig. 3 is a similar view with the parts in position they occupy when the work is positively clamped for the grinding operation;

Fig. 4 is a cross section on the line 4—4 of Fig. 2;

Fig. 5 is a similar view on the line 5—5 of Fig. 2.

Fig. 6 is a fragmentary sectional elevation, on an enlarged scale, showing the form of the connections between the actuating plate and the clamping plate.

Referring to the drawings:

1 designates a chuck spindle of tubular form mounted for rotation in bearings 2 on a machine frame 3, which spindle may be rotated from any suitable source of power. In the present instance a driving pulley 4 is keyed to the spindle and receives its power from a suitable source. The spindle has fixed to its forward end a chuck head 5 which may be equipped with appropriate clamping means for clamping the work piece against its seat on the head. Various forms of such clamping means may be employed, but in the present case I show by way of example, such clamping means in the form of a clamping plate 6 constituting a work clamping jaw, which extends across the face of the chuck and is carried by an actuating plate 7 connected with a pull rod 8 extending longitudinally through the chuck spindle, the arrangement of the parts being such that when the pull rod is drawn to the rear, the clamping plate will be moved towards the work seat and will engage the work and clamp the same in place, and when the rod is thrust forward, the clamping plate will be moved away from the work seat and will release the work.

The work piece A in the example shown is of annular or ring-like form, and the clamping plate is formed with a central opening through which the operating wheel may be introduced and entered in the bore of the ring. It will be understood, however, that other forms of work clamping means may be employed, which when the pull rod is moved in one direction will clamp the work, and when moved in the opposite direction will release the work.

The pull rod is preferably of tubular form and surrounds a fixed pipe 9 on which it may be shifted back and forth in actuating the work clamping plate, this pipe 9 being for the purpose of applying a stream of water or some cutting or polishing solution, to the work as might in some cases be found desirable. At its rear the pull rod extends beyond the chuck spindle and is enlarged interiorly, thereby forming an annular space 10 surrounding the pipe 9. The rear end of this space is closed by a sleeve 11 screwed into the rear end of the pull rod and sliding on the pipe 9, and the forward end of the space is closed by a tubular bushing 12 surrounding the pipe 9 and abutting at its forward end against the inner ends of two screw bolts 13 carried by a collar 14 fixed to and surrounding the spindle 1, which bolts extend through longitudinal slots 15 in the pull rod. A coiled expansion spring 16 is seated in the annular space 10 and bears at its rear end against the inner end of the sleeve 11, and bears at its opposite end against the rear end of the bushing 12. This spring takes its thrust against the bushing 12 and its tendency in expanding is to thrust the pull rod rearwardly and thereby cause the clamping plate to clamp the work against the work seat with spring pressure.

The pull rod is adapted to be moved forwardly to compress the spring and release the work, by means of a manually operated actuating lever 17 which is pivoted at its upper end as at 18 to a rectangular extension frame 19 fixed to the machine frame 3, the said lever being connected with a yoke 20 which extends on opposite sides of the rear portion of the pull rod. This lever is adapted to be swung forwardly and rearwardly in controlling the operation of the chuck actuating mechanism, and when swung to the rear as shown in Fig. 1, it will engage the end of a rocking member in the form of a lever 21 pivoted between its ends as at 21' to the extension frame, and having its end in position to engage the outer end of the threaded sleeve 11. As one end of the rocking lever is forced back by the actuating lever, its other end will be moved forwardly and will thrust the pull rod forwardly, thereby compressing the spring 16 against the bushing 12, and moving the clamping plate 6 away from the work seat and releasing the work. The actuating lever is held in this position while the operator removes the finished work piece and inserts a new one in position on the work seat. He then swings the lever to the right to the position shown in Fig. 2 thereby disengaging it from the rocking lever 21, so that the pull rod will be permitted to be moved to the rear by the expansion of the spring, and in this action, the clamping plate will be moved rearwardly towards the work seat and will engage and hold the work with yielding pressure under the influence of the spring. The work being thus yieldingly held on the work seat, may be shifted laterally in the operation of centering the same, which is effected by engaging the operating wheel with the work and moving it gradually laterally until the wheel will contact with the work uninterruptedly in the rotation of the same. The work now centered on the chuck is clamped positively and firmly in centered position so that the machining or other operation may be performed thereon. To effect this action, there are provided two pivoted fingers 22 mounted on the collar 14 before alluded to, and extending in the direction of the axis of the chuck spindle. Each of these fingers is in the form of an elbow lever comprising a long longitudinal arm $22^a$ and a short radial arm $22^b$, the elbow levers being pivoted in radial slots 23 in the collar 14 by means of pivot pins 24 so that they may rock on axes extending at right angles to the axis of rotation of the chuck. The long arms of the elbow levers extend rearwardly from the pivot pins, and the short arms extend inwardly radially and the latter are provided at their inner ends with lugs 25 in position to engage the front face of an annular shoulder 26 on the pull rod, the said shoulder being in the form of nuts screwed thereon to provide for their adjustment, and the arrangement of the parts being such that when the long arms are rocked outwardly by the means presently to be described, the terminal ends of the short arms will be swung rearwardly and will engage the shoulder 26 on the pull rod. The elbow levers are thus operated by means of a shiftable slide or spool 27 loosely surrounding the pull rod and formed with a number of annular stepped surfaces $27^a$ and $27^b$, etc., of gradually increasing diameters from the forward end of the spool toward its rear. The spool is formed with an annular groove 28 in its enlarged rear end, which groove loosely receives a ring 29 pivotally mounted within the yoke 20 of the actuating lever, so that by the shifting movements of the lever, the smaller end of the spool will be thrust between the rear ends of the long arms of the elbow levers, and the different stepped surfaces thereof brought to bear against said arms. When the actuating lever is moved to the left to release the work, the spool will be likewise moved and withdrawn from engagement with the arms $22^a$ of the elbow levers, so that the pull rod will be free to be moved forwardly to compress the spring as before described; and when the actuating lever is moved to the right for a portion of its throw, to allow the spring in expanding to operate the pull rod and apply a spring clamping pressure to the work, the spool will be still free of the arms $22^a$. When, now, the actuating lever is moved further forwardly to the right, the spool will be engaged with the arms $22^a$ and these arms will be swung outwardly and the shorter arms will be swung inwardly and engaging the annular shoulder on the pull rod, the latter will be positively shifted rearwardly which action will cause the clamping plate to clamp the work firmly and tightly, so that with the lever held in this position, the work will be positively and strongly held on its seat and prevented from shifting under the action of the operating wheel.

It will be understood, therefore, from the foregoing description that in one position of the actuating lever, the work clamping device will be moved away from the work seat and the work released; in the second position of the actuating lever, the work will be held with a yielding spring pressure so that it may be centered; and in the third position of the actuating lever, the work will be positively and firmly held to permit the desired operation to be performed thereon.

I prefer to so connect the clamping plate 6 with the actuating plate 7, that the clamping plate will be held in a loose or floating manner to the end that it will adjust itself in the clamping action to any unevenness in the parts. To effect this object the plate 6 is connected with the actuating plate by means of two studs or bolts $6^a$ which are screwed in threaded holes in the actuating plate and are provided at the inner ends with nuts $6^b$ adapted to bind against the rear side of the actuating plate and thus firmly lock the bolts fixedly in position. At their outer ends the bolts are provided with enlarged necks $6^c$ between which and the inner side of the actuating plate are arranged spools $6^d$, which at their outer ends are flush with the inner ends of the necks but which project outwardly beyond the necks, thereby forming in effect annular shoulders at the inner ends of the necks. Outward of the necks, the bolts are provided with enlarged heads $6^e$ the inner ends of which, where they unite with the necks, are rounded as at $6^f$, thereby forming rounded seats. The plate 6 is provided at opposite ends with holes which loosely encircle the necks, and these holes at their outer ends are concaved to correspond with and receive the rounded seats $6^f$ on the heads of the bolts, the distance between the concavities of the holes and the inner side of the plate 6 being less than that between the rounded seats and the outer ends of the spools. As a result, the clamping plate is capable of a limited amount of play or looseness between the bolt heads and the outer ends of the spools, and consequently, it can rock or tip on the rounded seats to a limited extent when drawn up by the actuating plate against the work piece.

To prevent the accumulation of dust or grindings between the clamping plate and the outer end of the work piece, the clamping plate is provided on its inner side with a number of raised surfaces or lugs $6^g$ arranged at intervals around the hole in the plate and in position to engage the outer end of the work piece when the plate is moved rearwardly to clamp the work.

In the foregoing description and accompanying drawings, I have set forth my invention in the particular detailed form which I prefer to adopt and which in practice has been found to answer to a satisfactory degree the ends to be attained. It will be manifest, however, that these details may be variously changed and modified without departing from the spirit of the invention, provided they will operate substantially as above described; and it will be understood that the invention is not limited to any particular form or construction of the parts, except in so far as such limitations are specified in the claims.

Having thus described my invention, what I claim is:

1. The combination of means for supporting the work, a movable clamping member adapted to engage the work and hold it on the supporting means, a spring acting on the clamping member and arranged in position to be placed under tension when said member is moved in a direction to release the work, an actuating lever for the movable member, a device in position to be engaged by said lever when the latter is moved in one direction, and operating when so engaged to act on and move the clamping member to compress the spring and release the work, said device when disengaged by the lever, permitting the spring to act on the clamping member and cause it to clamp the work with spring pressure, and means operated by the lever when the latter is moved in the opposite direction to positively move the clamping member and clamp the work with positive pressure.

2. In a chuck, the combination of a chuck head provided with a work seat, a work holding member mounted on the head and movable to and from the seat to respectively clamp and release the work, a pull rod connected with the work holding member and movable endwise to operate the member, a spring acting on the pull rod and arranged in position to be placed under tension when the pull rod is moved in a direction to release the work, whereby the spring in expanding will move the pull rod in the opposite direction and clamp the work with spring pressure, an actuating lever for the pull rod, and devices intermediate the lever and pull rod and actuated by the lever, said devices, adapted, when the lever is shifted to one position, to move the pull rod endwise in a direction to compress the spring and release the work, and adapted when the lever is moved to another position, to release the pull rod and permit the spring to move the same in the opposite direction to clamp the work with yielding pressure, and adapted when the lever is moved to a third position, to move the pull rod positively and clamp the work with a positive pressure.

3. In a chuck, the combination of a rotary chuck spindle, a chuck head connected thereto and provided with a work seat, a work holding member mounted on the head and movable to and from the seat to clamp and release the work, a pull rod shiftable endwise within the spindle and connected with the work holding member to operate the same, a coiled spring acting on the pull rod and adapted to be compressed when the pull rod is shifted in a direction to release the work, an actuating lever, means operated by the lever and acting when the lever is moved to one position, to shift the pull rod in a direction to compress the spring and release the work, whereby the spring in expanding will move the pull rod in the opposite direction and clamp the work with yielding pressure, and means operated by the lever and acting when the lever is shifted to another position, to positively move the pull rod in the same direction of movement as effected by the spring, and thereby clamp the work with positive pressure.

4. In a chuck, the combination of a rotary chuck spindle, a chuck head carried by the same and provided with a work holding member movable to clamp and release the work, a shiftable pull rod connected with the work holding member for operating it, a spring acting on the pull rod and adapted to be compressed when the pull rod is shifted in one direction to release the work, whereby the spring in expanding will shift the rod in the opposite direction and clamp the work with yielding pressure, an actuating lever for the pull rod, a rocking member engaged by the actuating lever in one position of the latter and operating on the pull rod to shift the same in the direction to release the work, and means operated by the lever in another position and acting on the pull rod to positively move it in the opposite direction to positively clamp the work.

5. In a chuck, the combination of a rotary chuck spindle, a chuck head carried thereby and provided with a work holding member movable to clamp and release the work, a shiftable pull rod connected with the work holding member for operating it, a spring acting on the pull rod and adapted to be compressed when the latter is shifted in a direction to release the work, whereby the spring in expanding will shift the rod in the opposite direction and hold the work with yielding pressure, an actuating lever, means operated by the lever and acting when the lever is moved to one position, to shift the pull rod in a direction to release the work, a slide shiftable on the pull rod and movable by said lever, and means operated by said slide and acting to shift the pull rod in the opposite direction to positively clamp the work, when the lever is moved to another position.

6. In a chuck, the combination of a hollow rotary chuck spindle, a chuck head carried thereby and provided with a movable work holding member adapted to clamp and release the work, a hollow pull rod shiftable endwise within the spindle and connected with a work holding member for operating it, a relatively fixed abutment within the pull rod, a spiral spring within the pull rod bearing at one end against said abutment and at its opposite end against the pull rod, said spring adapted to be compressed when the pull rod is shifted to release the work, whereby the spring in expanding will move the pull rod in the opposite direction and clamp the work with yielding pressure, a shiftable actuating lever, a rocking member having one end in position to be engaged by the lever when the latter is in one position, and having its other end in position to engage the pull rod and shift the same to release the work, whereby when the lever is disengaged from the rocking member, the spring in expanding will shift the pull rod and hold the work with yielding pressure, an annular shoulder on the pull rod, an elbow lever carried by the chuck spindle in position to engage the shoulder, and a slide movable on the spindle and operated by the actuating lever to rock the elbow lever.

7. In a chuck, the combination of a chuck body provided with a work seat, a work clamping member movable to and from the work seat to respectively clamp and release the work, and an actuating member loosely connected with the clamping member to permit of a limited movement of the clamping member relative to the actuating member; whereby the clamping member will automatically accommodate itself to unevenness in the clamped work.

8. In a chuck, the combination of a chuck body provided with a work seat, a work clamping plate movable to and from the work seat to respectively clamp and release the work, said plate being provided with bolt holes formed at one end with rounded concavities, an actuating member for the clamping plate provided with bolts extending through the holes in the clamping plate, said bolts having rounded seats engaging the concavities of the holes and having shoulders spaced from the seats to permit the plate to rock to a limited extent relative to the bolts; whereby the clamping plate will automatically accommodate itself to unevenness in the clamped work.

In testimony whereof, I have affixed my signature hereto.

CORTIS F. SHERMAN.